E. S. BEACH.
COTTON HARVESTER.
APPLICATION FILED AUG. 20, 1912.

1,135,096.

Patented Apr. 13, 1915.
6 SHEETS—SHEET 1.

WITNESSES:
Eric B. Kramer.
M. E. Silliman.

INVENTOR
Edward S. Beach

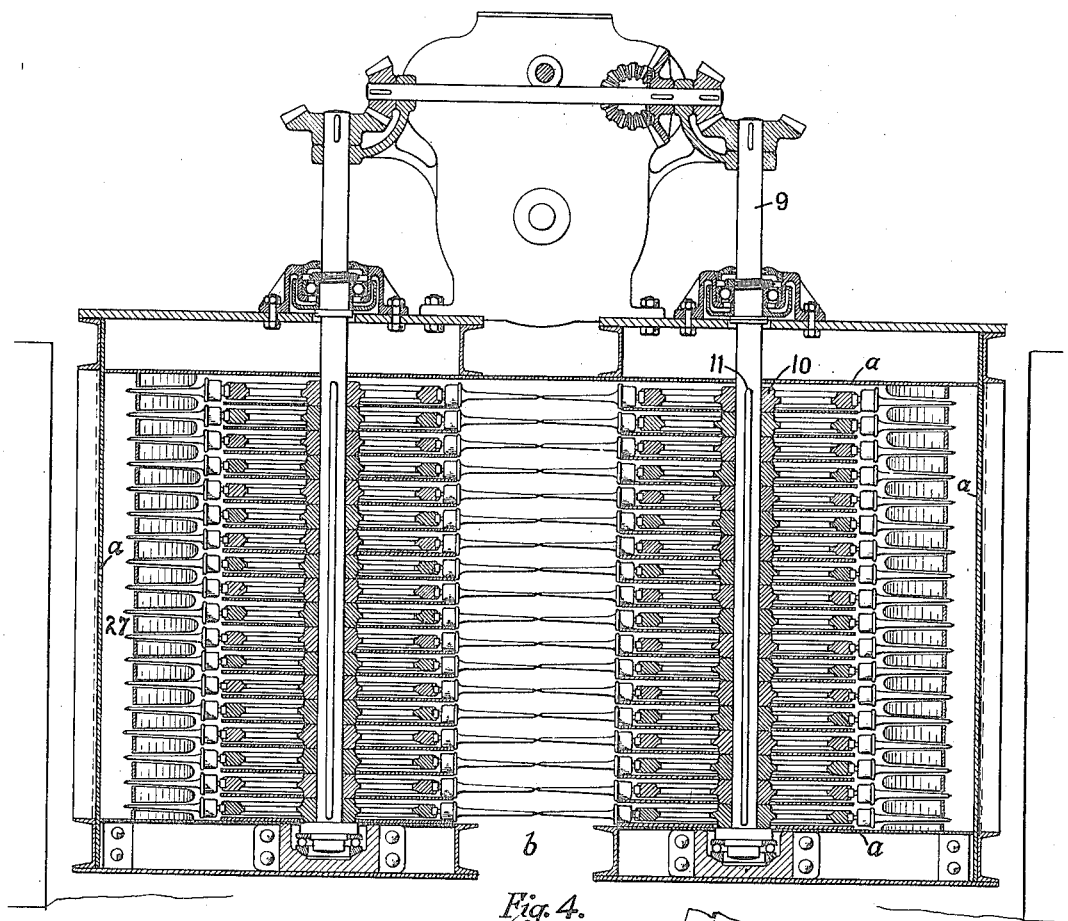
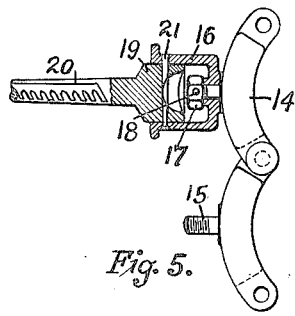
Fig. 5.
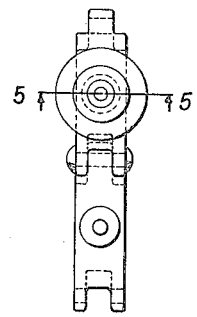
Fig. 6.
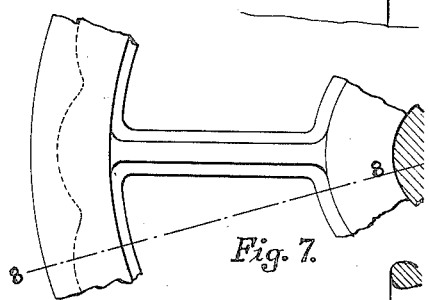
Fig. 7.
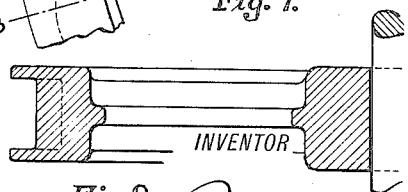
Fig. 8.

E. S. BEACH.
COTTON HARVESTER.
APPLICATION FILED AUG. 20, 1912.

1,135,096.

Patented Apr. 13, 1915.
6 SHEETS—SHEET 4.

WITNESSES:
Eric B. Kramer
M. E. Silliman

INVENTOR
Edward S. Beach

E. S. BEACH.
COTTON HARVESTER.
APPLICATION FILED AUG. 20, 1912.
1,135,096.
Patented Apr. 13, 1915.
6 SHEETS—SHEET 6.
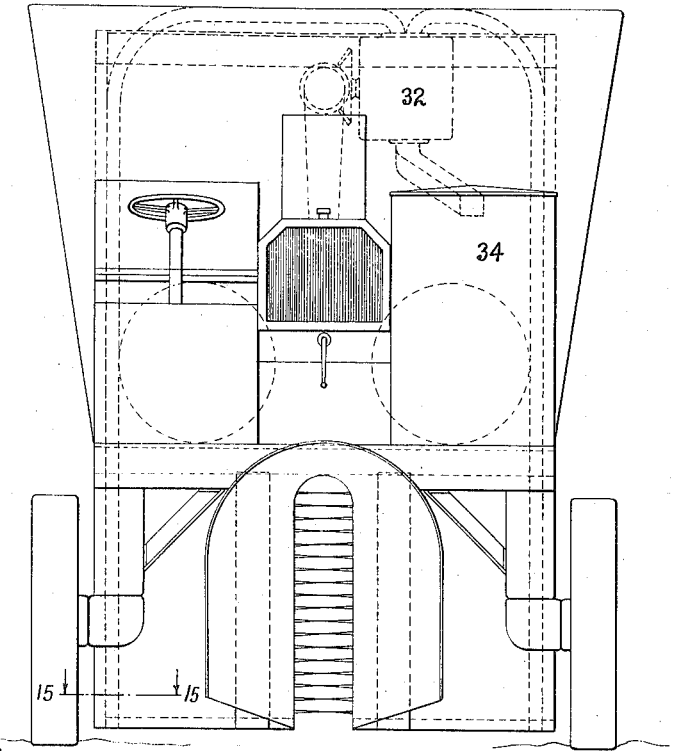
Fig. 14.
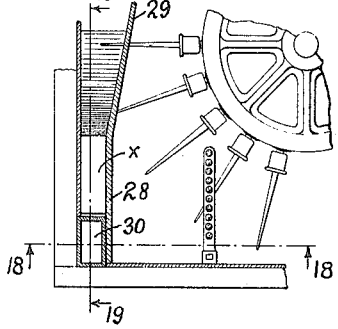
Fig. 15.

Fig. 17.
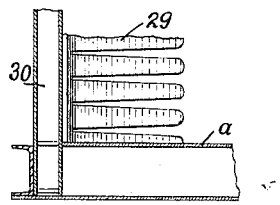
Fig. 18.
Fig. 19.
WITNESSES:
Eric B. Kramer
M. E. Silliman
INVENTOR
Edward S. Beach

UNITED STATES PATENT OFFICE.

EDWARD S. BEACH, OF RIDGEFIELD, CONNECTICUT, ASSIGNOR TO PRICE-CAMPBELL COTTON PICKER CORPORATION, OF WILMINGTON, DELAWARE, A CORPORATION OF DELAWARE.

COTTON-HARVESTER.

1,135,096.	Specification of Letters Patent.	Patented Apr. 13, 1915.

Application filed August 20, 1912. Serial No. 715,985.

*To all whom it may concern:*

Be it known that I, EDWARD S. BEACH, a citizen of the United States, residing at Ridgefield, in the county of Fairfield and State of Connecticut, have invented certain new and useful Improvements in Cotton-Harvesters, of which the following is a specification, reference being had therein to the accompanying drawing.

This invention relates to cotton-harvesters.

Its object is to reduce the cost of construction of such harvesters.

Figure 1:
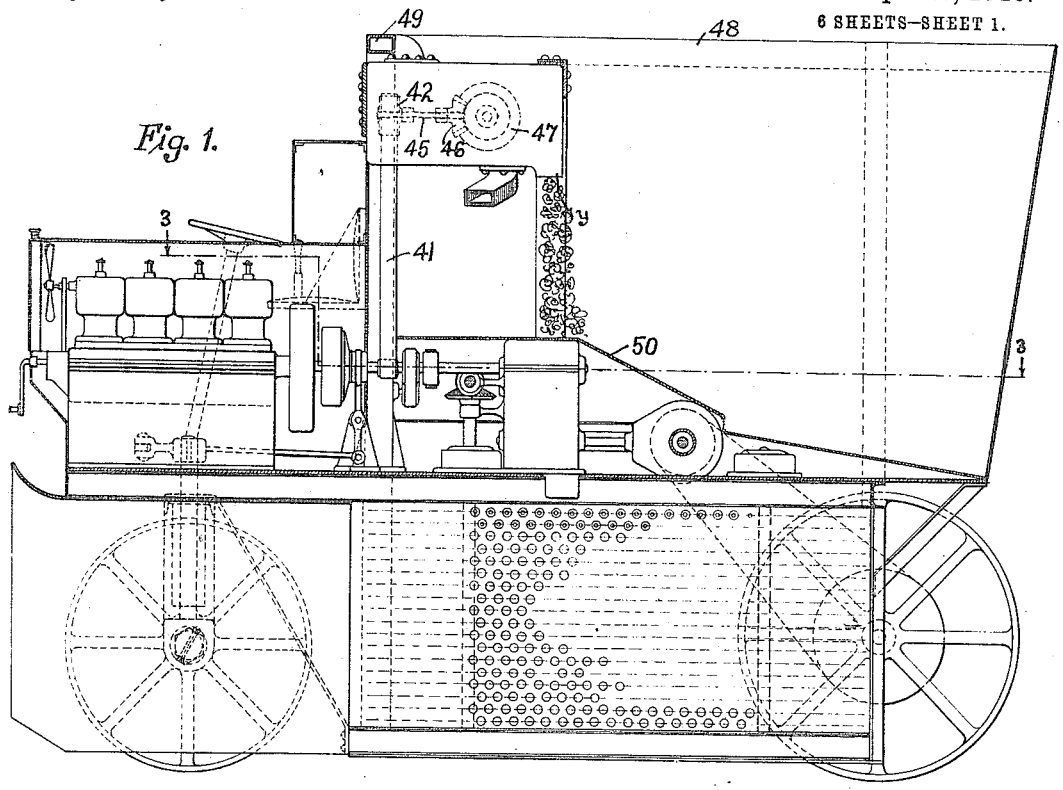
Figure 2:
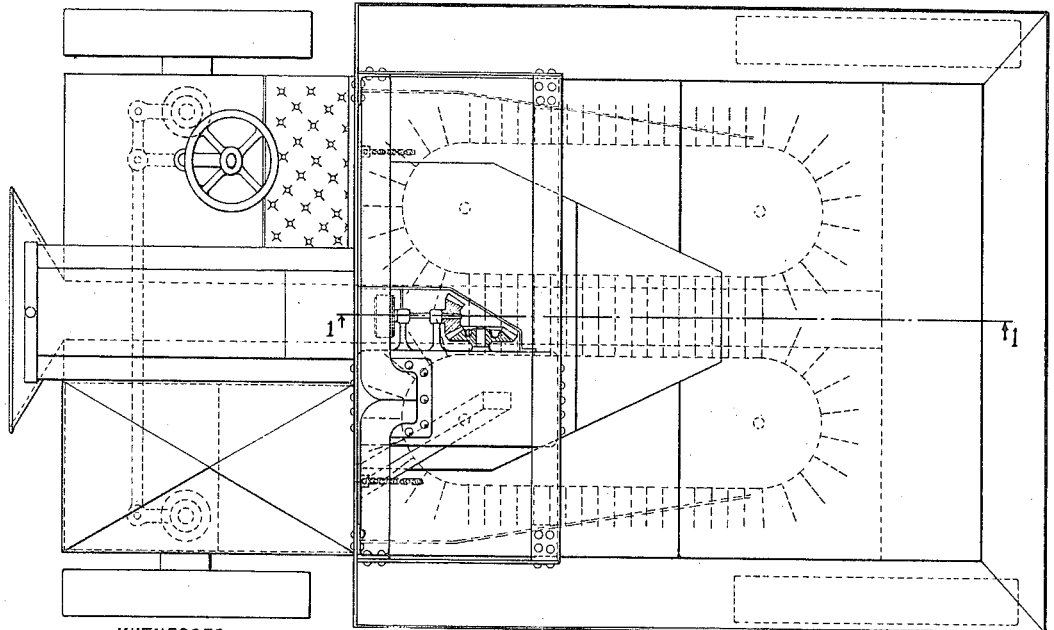
Figure 3:
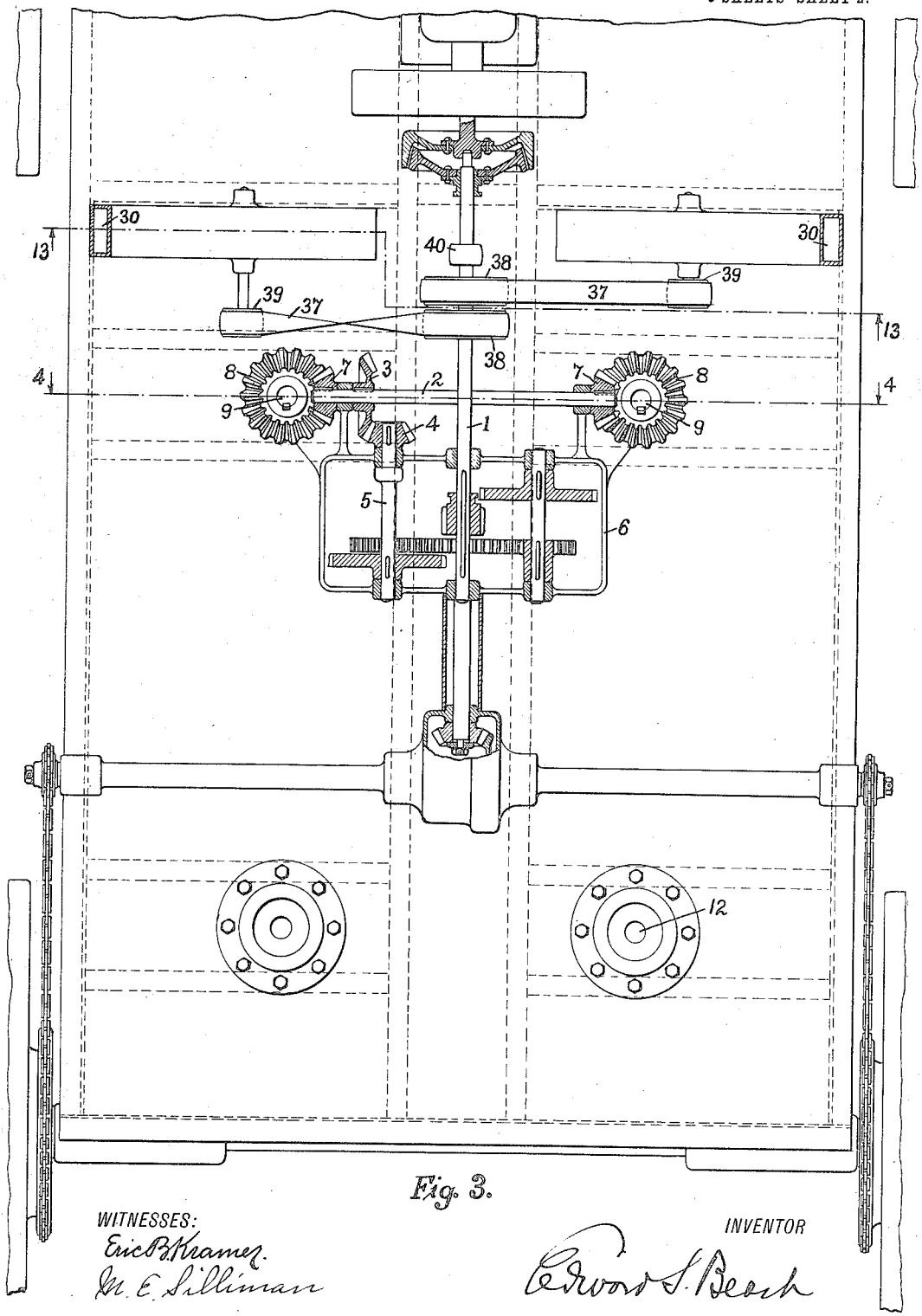
Figure 9:
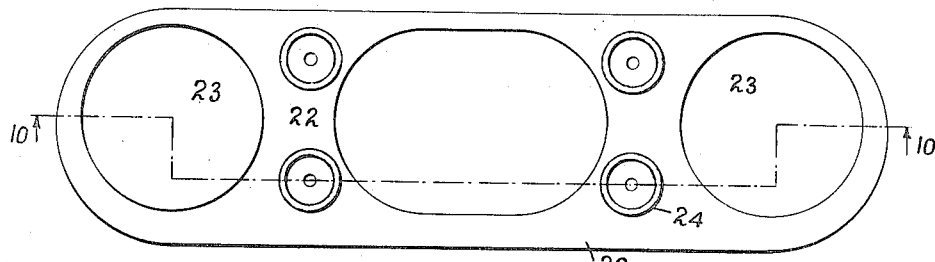
Figure 10:
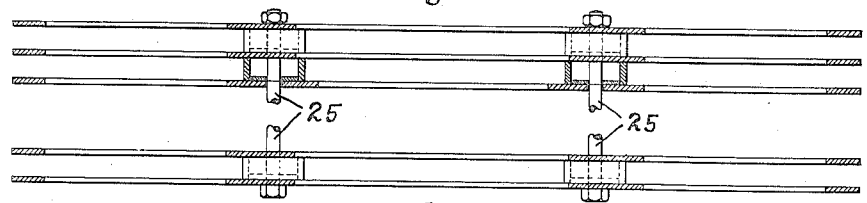
Figure 11:
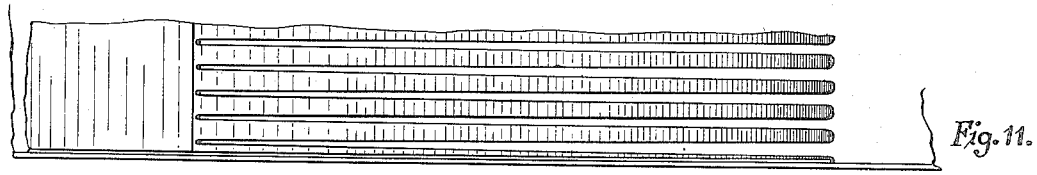
Figure 12:
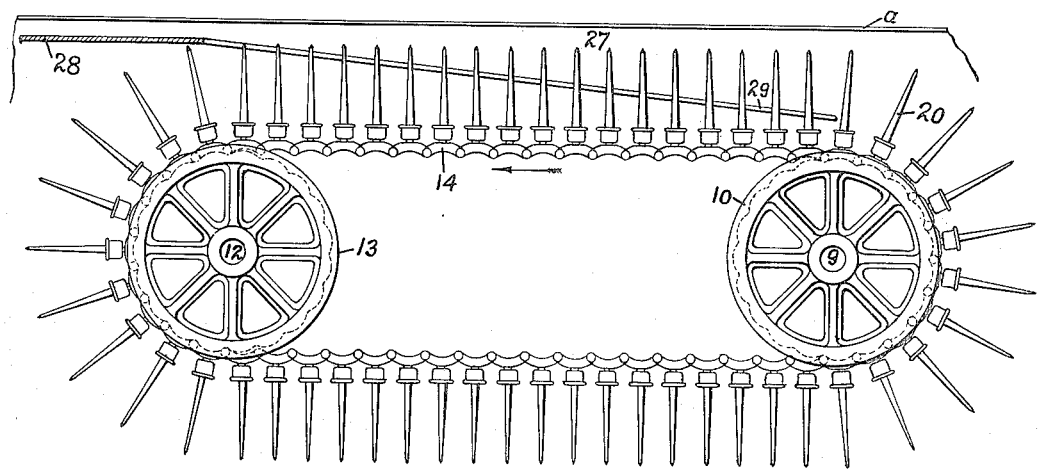
Figure 13:
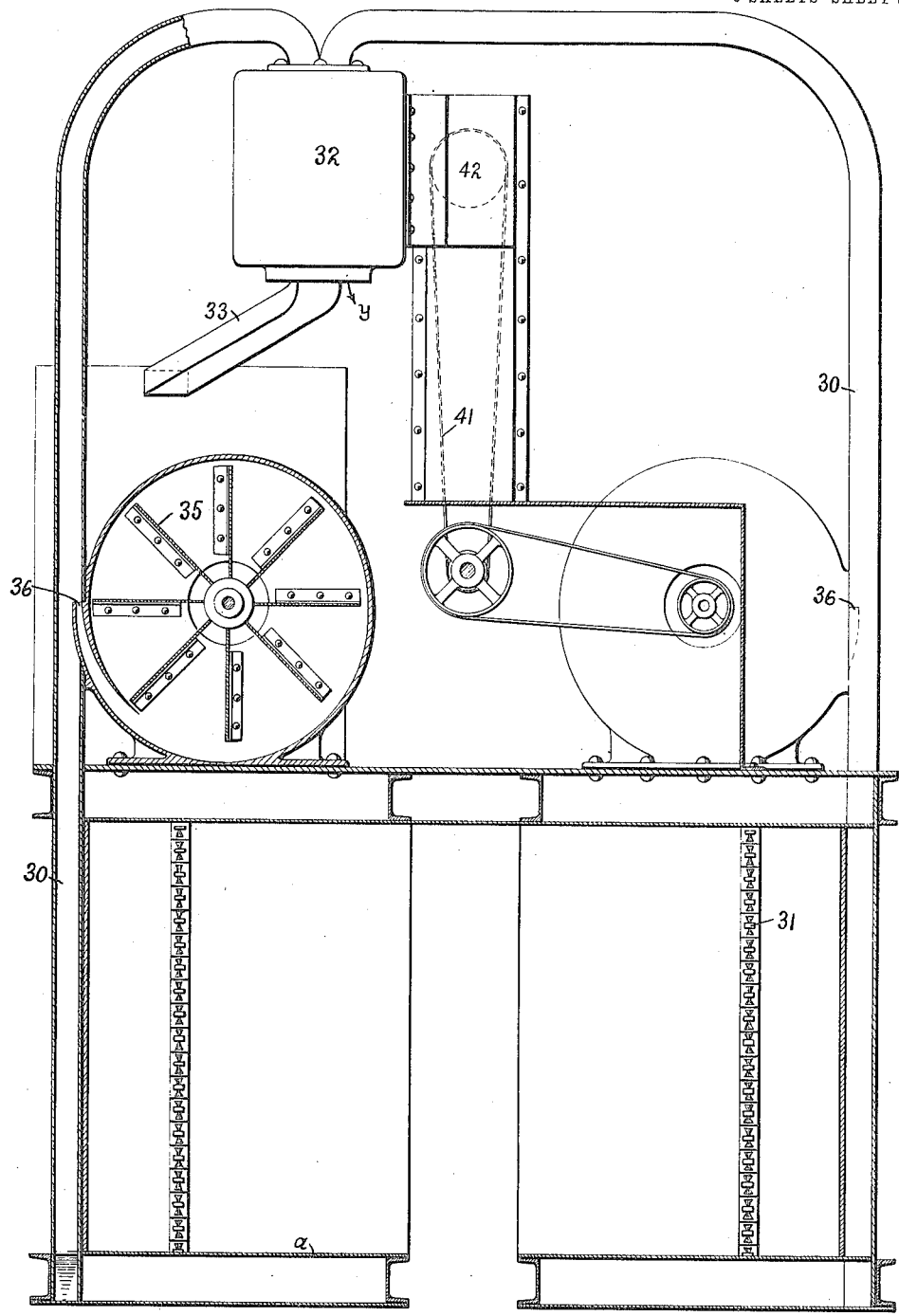
Figure 16:
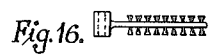

In the accompanying drawings,—Figure 1, is a vertical sectional view at a line corresponding to line 1—1 of Fig. 2. Fig. 2 is a top plan view. Fig. 3 is a view partly in elevation, looking down, and partly in horizontal section at a line corresponding to line 3—3 of Fig. 1. This view shows particularly the driving and actuating mechanism. Fig. 4 is a transverse section at a line corresponding to line 4—4 of Fig. 3. This view shows particularly a portion of the picker-finger actuating mechanism. Fig. 5 is a top plan view, partly in horizontal section, of a sprocket-chain, each link of which is adapted to carry a longitudinally movable and simultaneously rotating picker-finger, one of which is shown on one of the chain-links. Fig. 6 is a side view of the structure shown in Fig. 5. Fig. 7 is a view showing a portion of one of the sprocket-wheels for traveling the sprocket-chains, the links of which are provided with horizontally projecting picker-fingers. Fig. 8 is a sectional view at line 8—8 of Fig. 7. Fig. 9 is a top plan view on one of a stack of horizontal chain-separator plates, with four plate-spacing blocks in place. Fig. 10 is a sectional elevation of a portion of one of the stacks of the chain-spacing plates spaced apart by the spacing-blocks. Fig. 10 is taken on line 10—10 of Fig. 9. Fig. 11 is a side elevation of a portion of a stripper-comb for the picker-fingers. Fig. 12 is a top plan view of an endless sprocket-chain carried horizontally on horizontal sprocket-wheels, the chain-links carrying picker-fingers that are rotatable on their own axes. The view also shows mainly in top elevation the upper side of one of the teeth of the stripper-comb. Fig. 13 is an elevational view, partly in section at a line corresponding to line 13—13 of Fig. 3, and shows at each side of the central, lengthwise opening of the machine brushes for cleaning the picker fingers, and from each picker-drum an upwardly-extending chute that discharges into a seed cotton-cleaner provided with an outward discharge. The view also shows a pair of elevator fans, one in plan view, and the other in vertical section, for producing an upwardly ascending current in the chutes for sucking the cotton from the picker-drums and forcing it upwardly into the seed cotton-cleaner. The view also illustrates a portion of the fan-operating mechanism. Fig. 14 is a front elevation of the machine. Fig. 15 is a view showing a portion of one of the sprocket-wheels with picker-fingers projecting horizontally to pass between a vertical stack of finger-cleaning brushes. The view also shows a portion of the comb. Figs. 16 and 17 are different views of one of the series of finger-cleaning brushes. Fig. 18 is a sectional view at line 18—18 of Fig. 15. Fig. 19 is a vertical sectional view at a line corresponding to line 19—19 of Fig. 15, and shows the entrance of one of the chutes from the bottom of a picker-drum.

The machine shown in the drawings is a motor-driven vehicle, the power whereof is also used for actuating the picking, elevating and cotton-cleaning mechanisms; the combs or strippers and the finger-cleaning brushes being stationary.

Referring to the drawings, the drive-shaft 1 (Fig. 3) drives the gear-shaft 2 through a bevel-gear 3 which meshes with a bevel-gear 4 on a shaft 5 of the change-speed mechanism 6. Shaft 2 is provided at each end with a bevel-gear 7 that meshes with a horizontal gear 8 on a vertical shaft 9 of each cotton-picking apparatus, whereof there are two sets; one at one side and the other at the other side of the lengthwise central opening of the machine. Description of one set of picking mechanisms will suffice for both of them, as they are identical in construction and operation.

Shaft 9 carries a stack of horizontal sprocket-wheels 10, the hubs whereof are fixed to shaft 9 by a key 11, so that all the sprocket-wheels rotate simultaneously. The shaft 9 is the forward part of the machine and in line with it, toward the rear of the machine, is a vertical sprocket-wheel shaft 12 that is provided with a stack of sprocket-wheels 13 (Fig. 12). Each set of stacks of sprocket-wheels on the side of the machine are contained in a drum-casing, indicated by a. Each drum is open on its inner side, so that in the translation of the picker-fingers they project into, travel through and pass out of the central portion b of the machine (Fig. 4), this being the central, lengthwise passageway of the machine for the plants that are to be picked.

The sprocket-wheel chains are indicated by 14 (Fig. 12), and as shown in Figs. 5 and 6, each chain is provided with a stud 15, on which is rotatably mounted a cup 16, the cup being held in place by a nut 17 on the outer end of stud 15; the nut lying within the chamber of the cup, which may, if desired, be filled with lubricating material. The nut 17 is preferably pinned at 18 to stud 15. In the mouth of the cup there is inserted the shank 19 of a picker-finger 20, which is held non-rotatably in the cup by a tapered cotter-pin 21. The exterior of the cup is round and serves as a roller to secure rotation of the finger during its translation around the sprocket-wheel shafts 9 and 12.

Referring to Fig. 9, a series of sheet-metal, chain-spacing plates 22 are interposed between the horizontal sprocket-wheels and chains. The plates 22, at their ends, are provided with openings 23 for free reception of the stacks of sprocket-wheels. The plates 22 are spaced apart by spacing-blocks 24. The plates and the spacing blocks are clamped together stackwise by vertical bolts 25; the lowermost plate resting on the bottom of a picker-drum (Fig. 4). Relatively to the axes of the sprocket-wheel shafts 9 and 12, each plate 22 projects farther toward the central opening of the machine on its inner side than it does toward the outside, vertical casing of the drum, thus forming an inner margin 26 on which the peripheries of the cup 16 have a rolling contact (Fig. 4) to give them rotation during their translation.

As shown in Figs. 4 and 12, there is a free space 27 between the outer wall of the drum-casing and the outer ends of the picker-fingers successively opposed to the wall; and in this space a vertical comb or stripper 28 is mounted, the fingers 29 of the comb extending forwardly and inwardly, as shown in Fig. 12, between each horizontal set of picker-fingers. Consequently, when, as shown in Fig. 12, the picker-fingers on the outside of the set begin to travel rearwardly, the points of the comb-teeth are directed to the inner end of the picker-fingers, and as the latter travel rearwardly, the cotton is progressively thrust outward by the wedging action of the comb-teeth. Relatively to the centers, or to the vertical plane through the axes of the sprocket-wheels 9 and 12, the plates 22 are narrowed so that in the rearward movement of the picker-fingers, the cup-rollers 16 are out of contact with the plates, and consequently, during the stripper movement, the picker-fingers are practically not in rotation.

The stripped cotton drops into the space 27, and naturally gravitates to the bottom of the casing, where, as shown in Fig. 19, it is exposed to suction created in the elevator chute 30. The cotton-picking fingers, in their course of translation, after being stripped, have passed between the brushes 31. Each chute 30 extends upwardly into a cotton-cleaning device 32, of any desired interior construction, provided with an outward discharge spout 33 that delivers dirt, etc., into a can 34 at the side of the driver's seat.

The suction is produced in each elevator-chute by a fan 35, the casing of which discharges upwardly at 36 into the elevator-chute 30 (Fig. 13). The fans are driven simultaneously (Figs. 3 and 13) by belts 37 running from pulleys 38 on the drive-shaft 1 to pulleys 39 on the fan-shafts.

The seed-cotton cleaning mechanism, the casing of which is elevated high above the other mechanisms, is driven from pulley 40 (Fig. 3) on drive-shaft 1 by a belt 41 (Fig. 1) to a pulley 42 on a horizontal shaft 45 provided with a bevel-gear 46 that meshes with a gear 47 on the drive-shaft of the cotton-cleaning mechanism. The cotton-cleaning mechanism is contained in the upper portions of a high body of the machine rearwardly of the driver's seat and over the cotton-picking mechanisms. The opposite sides in the rear end of this cotton-receiving body, or carrier, or van, may be made of duck fixed upon stanchions 49. The bottom 50 of the chamber thus formed is preferably slanted downwardly and rearwardly, so that the cotton discharged from the cotton-cleaning mechanism may be carried in considerable quantities by the body or van of the machine. The cotton discharge-port of the seed-cotton cleaning mechanism is indicated by y and overhangs the chamber or space of the body or van 48.

What I claim, is—

In a cotton-picking machine organized with a central, lengthwise-extending passageway for the plants, the combination of a pair of vertical sprocket-carrying shafts spaced apart in the direction of the length of the machine; for each shaft a series of sprocket-chains alternating with a series of plates; and on each sprocket-chain a series of fixed horizontally-projecting rotatable cups each carrying a therein-demountably-fixed and therefrom-projecting picker-finger; each cup having an annular roll-forming wall which is adapted to contact with the inward margin of a plate adjacent said passageway to rotate the finger during its picking movement, and the opposite outward margin of the plate being out of the path of said roller when its course is adjacent to such outward margin; and finger-stripping devices.

In testimony whereof I have affixed my signature in presence of two witnesses.

EDWARD S. BEACH.

Witnesses:
M. E. SILLIMAN,
G. BLAKE.